Oct. 28, 1958    L. F. WOUTERS    2,858,452
RADIATION WAVE DETECTOR
Filed Jan. 10, 1957

INVENTOR.
LOUIS F. WOUTERS
BY
ATTORNEY.

United States Patent Office 2,858,452
Patented Oct. 28, 1958

2,858,452

RADIATION WAVE DETECTOR

Louis F. Wouters, Hayward, Calif., assignor to the United States of America as represented by the United States Atomic Energy Commission Application January 10, 1957, Serial No. 633,513

8 Claims. (Cl. 250—200)

The present invention is directed to the detection of the shape and amplitude of a radiation wave, such as for example gamma ray radiation as may be emitted from nuclear fission reactions.

Although the present invention is in no wise limited to the detection of any particular type of radiation or to the detection of radiation from any particular type of source, it has been found to be especially useful in measuring wave shapes of atomic radiation and is thus referenced somewhat to such utility herein. It is of prime importance in many instances, such as for example in the vicinity of atomic reactions to determine not only the quantity of radiation or maximum level thereof, but to accurately measure the actual shape of radiation waves. Many reactions originally produce a radiation wave followed by more or less steady radiation; however, in various other situations such as pulsed operation of certain equipment as particle accelerators there are produced spaced radiation waves. Not only in the bearing that the radiation wave shape and amplitude has upon the proper interpretation and understanding of the reaction producing same is the present invention of importance, but also in the analysis of radiation hazards and the production of adequate safety measures and testing of same is this invention particularly advantageous. Furthermore, conventional detecting equipment commonly fails to properly measure initial radiation intensity from a nuclear reaction and this initial radiation often has a peak amplitude far in excess of the subsequent radiation. Although such peak amplitude radiation is generally of very short duration, a determination of the nature of propagation thereof and the energy included therein is of great interest. The present invention operates to provide accurate information of such initial radiation and is thus sometimes termed a prompt radiation wave detector.

It is an object of the present invention to provide an improved time distributed radiation wave detector.

It is another object of the present invention to provide a radiation detector indicating radiation wave amplitude at predetermined time intervals as incident upon a single point.

It is a further object of the present invention to provide means for automatically indicating at spaced intervals of time the radiation intensity at a fixed point as a measure of a radiation wave passing the point.

It is yet another object of the present invention to provide a simplified radiation wave detector having but a single detector with electronic means recording incident radiation intensity at spaced intervals.

Numerous other advantages and possible objects of the present invention will become apparent to those skilled in the art from the following description of a single preferred embodiment thereof taken together with the accompanying drawings wherein.

The invention in brief comprises a detector adapted to produce from incident radiation light proportional thereto and in surrounding and viewing relationship to this detector are disposed a plurality of light sensitive devices producing electrical signals proportional to incident light when actuated. For obtaining time spaced signals proportional to radiation at predetermined intervals the light sensitive devices are actuated in sequence following detector incidence of a predetermined radiation level by electronic means. The time spaced signals so produced are then separately amplified and relayed to recording means. The final recording step in the process may consist only of recordation of each signal with an identification thereof for later sorting and use or may comprise a time recording wherein a graph of radiation intensity vs. time or distance is directly produced.

Figure 1:
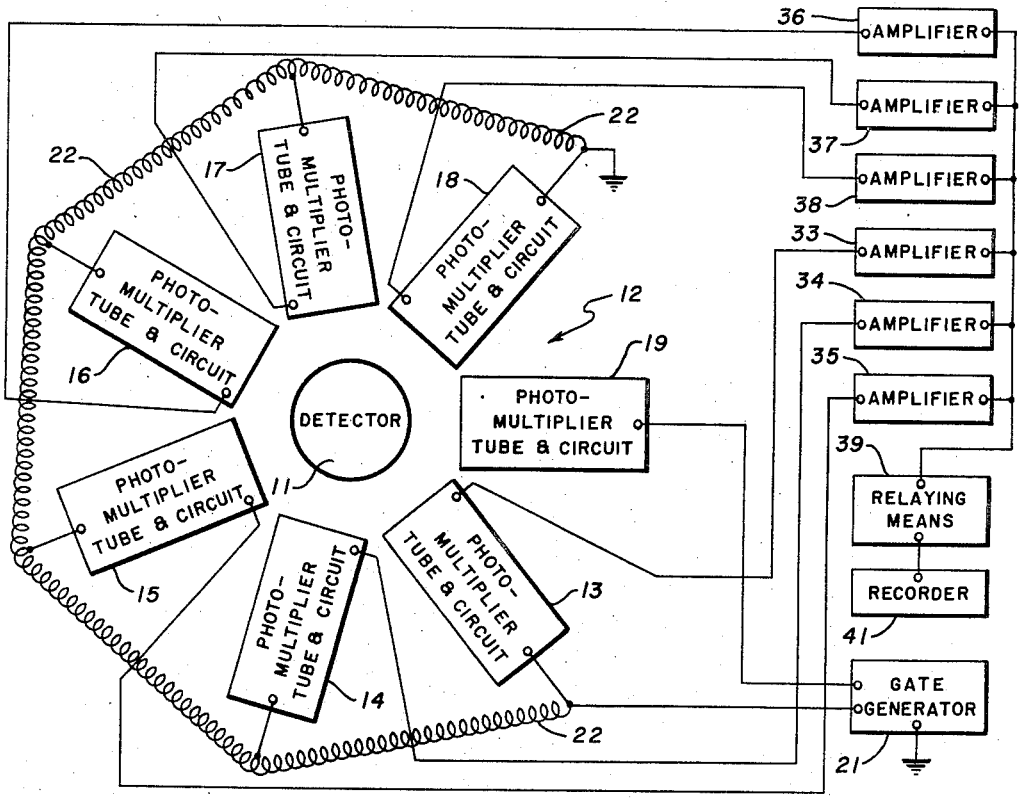
Figure 1 is a circuit diagram of the radiation wave detector of this invention.

Considering now the present invention in some detail and referring first to Fig. 1 thereof, there is provided as a source of input information to the circuit a radiation detector 11 which may comprise a scintillator or any one of various well-known devices of the type producing visible light emanations proportional to incident radiation. The particular detector chosen for any particular application is dependent at least in part upon the kind of radiation to be measured and may comprise, for example, a scintillation crystal such as stilbene. The light emanating from the detector 11 is viewed by an array of electron-multiplier phototubes 12, or photomultipliers as they are commonly termed. This photomultiplier tube array 12 is oriented relative to the detector so that the light reaching the individual tubes thereof from the detector is equally attenuated, as for example by a circular tube disposition, as shown, and/or by the use of one or more light pipers from the detector to the photomultiplier tubes. The array 12 may comprise individual tubes 13–18, for example.

An additional photomultiplier tube 19 is disposed with the array 12 to receive light from the detector and this tube 19 is adapted to produce electrical output signals which are applied to a biased gate signal generator circuit 21 which in turn produces an output pulse when the input signal level exceeds a predetermined minimum amplitude. The individual tubes 13–18 of the array 12 are adapted for gated operation through a delay line 22 connected at one end to the output of the gate signal generator and at the other end to ground, for example. The individual photomultiplier tubes 13–18 are separately connected to the delay line at spaced points therealong and the gating may be accomplished via the early dynodes of the photomultiplier tubes, as shown in Fig. 2.

Figure 2:
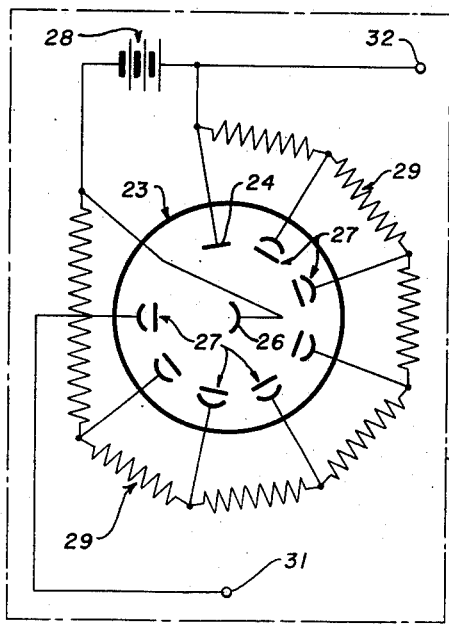
Figure 2 is a wiring diagram of a photomultiplier tube and power supply such as is employed in the circuit of Fig. 1.

A typical photomultiplier tube circuit applicable in the present invention is shown in Fig. 2 wherein tube circuit 14 is illustrated. Considering for a moment this circuitry, a photomultiplier tube 23 is provided having an anode 24, cathode 26, and a plurality of electron emissive dynodes 27. A suitable power supply 28 is connected between anode and cathode and oriented to make the former electrically positive with respect to the latter. A tapped resistor 29 connects opposite sides of the power supply and the tube dynodes 27 are separately connected to individual resistor taps to impress operating potentials on the dynodes. Gating of the photomultiplier tube may be accomplished by connecting the early or first dynode adjacent the light sensitive cathode to an input terminal 31 rather than to a resistor tap. In the absence of an input or gating signal to the input terminal and thus to the early dynode, there is no potential impressed upon the early dynode so that no electrons travel thereto from the photoemissive cathode even when the latter is subjected to light. In this manner the photomultiplier tube is rendered operative only during the interval that a gating signal is impressed upon the early dynode thereof and the gating signal preferably equals the normal early dynode bias were the dynode connected to an appropriate resistor tap. An output terminal 32 is connected to the tube anode 24 to receive an amplified signal during gated tube operation.

Referring again to Fig. 1, there will be seen to be provided a plurality of amplifier circuits 33–38 with the inputs thereof connected to the outputs of the photomultiplier tube circuits 13–18, respectively. These amplifiers 33–38 may include time delay means if desired to further space apart the signals received thereat. The amplifier outputs are all connected to the input of relaying means 39 in the instance where the amplified signals are to be transmitted some distance from the detector sight for use and the relaying means 39 feeds a recorder 41. Different types of information recording may be employed depending upon the circumstances and peculiarities of any particular application. For example, a roll recorder may be used wherein input signals are plotted against time on a revolving drum or merely the signal amplitude and sequence recorded for subsequent plotting as by hand.

Figure 3:
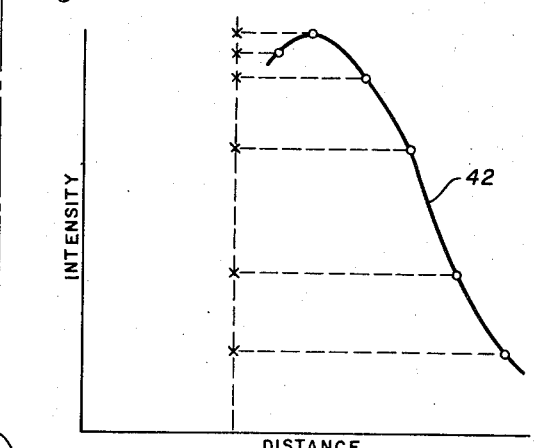
Figure 3 is a graph of a typical radiation wave as plotted from data obtained with the present invention.

There is shown in Fig. 3 a typical radiation wave plot obtained by the present invention or from information obtained therefrom. Referencing the plot to operation of the invention, it will be seen that as the radiation intensity rises to produce increasing light emanations from the detector 11 the photomultiplier tube circuit 19 produces an increasingly larger output signal. Note that this photomultiplier tube circuit is conventionally connected similar to the circuit of Fig. 2 but with the early dynode connected to a resistor tap so that all tube elements are normally energized and the tube continuously operates. As the radiation intensity increases to a sufficient value to cause the tube 19 to produce an output signal in excess of a predetermined bias value of the gate signal generator, the latter is triggered to produce an output pulse of predetermined amplitude. This gate signal pulse is applied to one end of the delay line 22 and travels therethrough at a velocity dependent upon the line characteristics. This gating pulse will thus be seen to be applied to the photomultiplier tube circuits 13–18 at spaced intervals whereby these tubes are successively energized to produce signals proportional to incident light at the time of tube energization. The photomultiplier tube output signals are then amplified and relayed to recording means.

The resultant data from the invention may be referenced to distance rather than time as the radiation propagation velocity is substantially a constant $c$, the velocity of light. Thus distance $x=ct$ where $t$ is time and with equal time increments between separate photomultiplier tube energization the measured and recorded photomultiplier tube signals may then be plotted against distance wherein equal distances separate each tube signal. As shown in Fig. 3 a plurality of tube signals noted along a single vertical dashed line may be each moved therefrom a distance corresponding to the tube time sequence to form points on a curve 42 depicting special radiation wave intensity distribution. Intensity may form one of the ordinates inasmuch as the photomultiplier tube signal amplitudes are proportional to radiation wave intensity at the detector. The curve of Fig. 3 shows only part of a radiation wave as might be obtained with a limited number of photomultiplier tubes in the array 12 and a high bias on the gate signal generator 21.

What is claimed is:

1. A radiation wave detector comprising a radiation detector producing light emanations proportional to incident radiation intensity, a plurality of light-sensitive devices viewing said detector for producing electrical signals proportional in amplitude to incident light intensity, means for sequentially actuating said devices at spaced intervals for producing a plurality of electrical signals at predetermined time intervals, amplifying means similarly amplifying signals from said devices, and recording means for recording said amplified signals as a measure of a radiation wave.

2. A radiation wave detector comprising radiation detection means for producing light proportional to incident radiation intensity, a plurality of gated light-sensitive devices viewing only said detection means for producing electrical signals proportional to viewed light intensity, means for producing a gating signal at a predetermined radiation intensity at said detection means, time delay means for applying said gating signal to said devices at predetermined time intervals for sequentially actuating same, and means recording the electrical signals from said light-sensitive devices as a measure of radiation wave configuration.

3. A radiation wave detector as claimed in claim 2 further defined by said recording means plotting said electrical signals from the light-sensitive devices at spaced intervals proportional to the time spacing of the signals for tracing a plot of radiation wave intensity against distance along said radiation wave.

4. A radiation wave detector comprising a radiation detector producing light emanations proportional to incident radiation of a predetermined nature, an array of photomultiplier tubes viewing said detector for producing voltage signals proportional to receive light intensity, gating means producing a controlled gate signal voltage pulse, means impressing said gate signal pulse upon the individual photomultiplier tubes of said array sequentially at predetermined time intervals for actuating said tubes in sequence whereby each of said tubes produces a voltage pulse proportional to receive light intensity at the time of tube actuation, and means separately recording the individual pulse output signals of said photomultiplier tubes as a measure of radiation wave intensity at a plurality of points along the wave.

5. Radiation wave measuring means comprising a radiation detector of the scintillation type, an array of photomultiplier tubes arranged to view only said detector, a gate signal generator controllably producing a voltage pulse as a gate signal, a delay line connected at spaced points thereon to each of the photomultiplier tubes of said array and to said gate signal generator for impressing said gate signal upon said photomultiplier tubes sequentially at spaced intervals for thereby actuating said tubes individually to produce an output pulse proportional to the instantaneous intensity of light received thereby, and means separately recording the amplitude of pulses from the tubes of said array of photomultiplier tubes as an indication of radiation wave configuration.

6. Means as defined in claim 5 further characterized by an additional photomultiplier tube viewing said detector and producing an output proportional to incident light means connecting the input of said gate signal generator to the output of said additional photomultiplier tube, and said gate signal generator producing an output voltage pulse of predetermined amplitude with an input signal in excess of a variable bias for controlling the radiation level at which the photomultiplier tubes of said array are actuated.

7. Means as defined in claim 5 further characterized by the early dynodes of the photomultiplier tubes of said array being connected only to the spaced points on said delay line whereby said tubes are inoperative in the absence of a gate signal pulse through said delay line.

8. Radiation wave measuring means comprising a radiation detector producing light of an intensity proportionate to that of incident radiation, an array of photomultiplier tubes viewing said detector and each energized for operation except as to the early dynode of each, a delay line, means connecting the early dynodes of said photomultiplier tubes to spaced points on said delay line, a control photomultiplier tube energized for operation and viewing said detector, a gate signal generator producing a single output pulse when an input signal exceeds a predetermined amplitude and having the input thereof connected to the output of said control photomultiplier tube, means connecting said gate signal generator output across said delay line for sequentially gating the photomultiplier tubes of said array, and means individually recording the output of the photomultiplier tubes of said array.

References Cited in the file of this patent
UNITED STATES PATENTS 2,728,863   Goodyear _____ Dec. 27, 1955